United States Patent
Kanazawa

(10) Patent No.: US 8,548,769 B2
(45) Date of Patent: Oct. 1, 2013

(54) DEVICE AND METHOD FOR DETECTING STOPPED STATE OF VEHICLE, AND ALIGNMENT ADJUSTING DEVICE

(75) Inventor: Atsushi Kanazawa, Takaishi (JP)

(73) Assignee: Toyota Jidosha Kabushiki Kaisha, Toyota-Shi (JP)

( * ) Notice: Subject to any disclaimer, the term of this patent is extended or adjusted under 35 U.S.C. 154(b) by 336 days.

(21) Appl. No.: 13/062,393

(22) PCT Filed: Oct. 27, 2009

(86) PCT No.: PCT/JP2009/005653
§ 371 (c)(1),
(2), (4) Date: Mar. 4, 2011

(87) PCT Pub. No.: WO2010/050180
PCT Pub. Date: May 6, 2010

(65) Prior Publication Data
US 2011/0161045 A1 Jun. 30, 2011

(30) Foreign Application Priority Data
Oct. 30, 2008 (JP) .................... 2008-280520

(51) Int. Cl.
*G06F 15/00* (2006.01)
*G06F 7/00* (2006.01)

(52) U.S. Cl.
USPC ............................................ 702/150; 701/65

(58) Field of Classification Search
USPC ........................................................ 702/150
See application file for complete search history.

(56) References Cited

U.S. PATENT DOCUMENTS

| 5,600,435 A | 2/1997 | Bartko et al. |
| 8,306,711 B2 * | 11/2012 | Suzuki et al. .................... 701/65 |
| 2003/0024132 A1 * | 2/2003 | Kokura et al. ................... 33/712 |

FOREIGN PATENT DOCUMENTS

| EP | 0 757 229 A2 | 2/1997 |
| JP | 11-152060 A | 6/1999 |
| JP | 2000-331281 A | 11/2000 |
| JP | 2001-004344 A | 1/2001 |
| JP | 2003-515157 A | 4/2003 |
| JP | 2003-226259 A | 8/2003 |
| JP | 2007-525682 A | 9/2007 |

* cited by examiner

*Primary Examiner* — Bryan Bui
(74) *Attorney, Agent, or Firm* — Kenyon & Kenyon LLP

(57) ABSTRACT

Provided are a device and a method for detecting a stopped state of a vehicle which are capable of precisely detecting the stopped state of the vehicle in order to automate an operation which is externally provided to the stopped vehicle such as an alignment adjusting operation; and an alignment adjusting device to which the device and the method for detecting a stopped state of a vehicle are applied. An arithmetic unit detects, with respect to the left-front tire, for example, an evaluation point of the left-front tire on the basis of the gravity point of a triangle comprising, as vertexes, a point A, a point B, and a point C which are detected by a group of distance sensors; detects an evaluation point of the left-front fender on the basis of a point detected by the group of distance sensors; and detects the stopped state of the vehicle on the basis of the respective evaluation points of the respective tires and the respective evaluation points of the respective fenders.

11 Claims, 12 Drawing Sheets

(a)

(b)

(a)

(b)

(a)

(b)

DEVICE AND METHOD FOR DETECTING STOPPED STATE OF VEHICLE, AND ALIGNMENT ADJUSTING DEVICE

This is a 371 national phase application of PCT/JP2009/005653 filed 27 Oct. 2009, claiming priority to Japanese Patent Application No. 2008-280520 filed 30 Oct. 2008, the contents of which are incorporated herein by reference.

TECHNICAL FIELD

The present invention relates to a device and a method for detecting a stopped state of a vehicle and an alignment adjusting device to which the device or the method for detecting the stopped state of the vehicle is applied.

BACKGROUND ART

At work of alignment adjustment of a vehicle such as a motorcar, the vehicle must be stopped at a predetermined position on an alignment adjusting device.

As a general method for positioning the vehicle at the predetermined position on the alignment adjusting device, there is a method with a wheel stopper or a guide. In such a method, the wheel stopper is provided at a position which is standard in the longitudinal direction of the vehicle. An operator operates the vehicle and stops the vehicle while making wheels (tires) of the vehicle touch the wheel stopper, thereby positioning the vehicle the longitudinal direction. Otherwise, a guide is provided at a position which is standard in the lateral direction of the vehicle and the vehicle is stopped while arranging the tire along the guide, thereby positioning the vehicle the lateral direction.

However, the size and width of the tire is different for the type of the vehicle so that it is difficult to secure the positioning accuracy with the conventional positioning method.

As mentioned above, the stopped position of the vehicle is dispersed so that it is difficult to hold adjusting tools automatically to the adjustment portions arranged inside and outside the vehicle without touching the surrounding, whereby the adjustment work of the alignment cannot be automated. Namely, typically of the adjustment work of the alignment, for automating the work which requires adjusting tools to be held to predetermined positions from the outside of the vehicle, the stopped status of the vehicle must be detected correctly as the premise. In this case, the stopped status of the vehicle is a notion including the stopped position and stopped posture of the vehicle (that is common below).

Conventionally, for example, an art for detecting position of a vehicle is disclosed in the Patent Literature 1 shown below.

In the conventional art shown in the Patent Literature 1, an area sensor is arranged at a position through which the tire of the vehicle passes, and when the tire passes through the monitoring area, the time at which a photo detector of the area sensor is blocked and the signal is shut off is measured and inputted to a signal processor, and then the signal processor specifies the center position of the tire based on the length of the time at which the signal is shut off, whereby the position of the vehicle is detected.

However, with the art shown in the Patent Literature 1, it is difficult to detect the stopped status of the vehicle accurately.

Patent Literature 1: JP 2001-331281 A

SUMMARY OF INVENTION

Technical Problem

The present invention is provided in consideration of the conditions as mentioned above, and the purpose of the invention is to provide an art for detecting a stopped state of a vehicle which are capable of precisely detecting the stopped state of the vehicle in order to automate an operation which is externally provided to the stopped vehicle such as an alignment adjusting operation.

Solution to Problem

The above-mentioned problems are solved by the following means according to the present invention.

A device for detecting a stopped state of a vehicle according the first aspect of the present invention has a plurality of tires and a body in which a plurality of fenders respectively corresponding to the tires are formed, and comprises a plurality of groups of distance sensors respectively corresponding to the tires and the fenders and an arithmetic unit connected to the groups of the distance sensors.

Each of the groups of the distance sensors comprises: a front distance sensor scanning the front portion of the outer side surface of the tire corresponding to the group of the distance sensors and detecting coordinate of a portion of the front portion of the tire at which the tire expands the most outward along the direction of the side surface of the tire as a first point; a rear distance sensor scanning the rear portion of the outer side surface of the tire corresponding to the group of the distance sensors and detecting coordinate of a portion of the rear portion of the tire at which the tire expands the most outward along the direction of the side surface of the tire as a second point; an upper distance sensor scanning the upper portion of the outer side surface of the tire corresponding to the group of the distance sensors and detecting coordinate of a portion of the upper portion of the tire at which the tire expands the most outward along the direction of the side surface of the tire as a third point; and a fender part distance sensor scanning the fender corresponding to the group of the distance sensors and detecting coordinate of a portion of the fender at which the fender expands the most outward along the direction of the side surface of the body as a fourth point.

The arithmetic unit detects an evaluation point of the tire based on coordinate of a centroid point of a triangle formed with the first, second and third points detected by the group of the distance sensors, and detects an evaluation point of the fender based on the coordinate of the fourth point detected by the group of the distance sensors so as to detect the stopped state of the vehicle based on the coordinate of the evaluation point detected about each of the tires and the coordinate of the evaluation point detected about each of the fenders.

In one of the forms of exploitation of the present invention, preferably, the upper distance sensor also serves as the fender part distance sensor.

In one of the forms of exploitation of the present invention, preferably, each of the groups of the distance sensors comprises noncontact distance sensors, and each of the distance sensors is arranged at a position separated for a predetermined distance from the corresponding tire.

In one of the forms of exploitation of the present invention, preferably, each of the groups of the distance sensors comprises laser sensors.

A method for detecting a stopped state of a vehicle according the second aspect of the present invention has a plurality of tires and a body in which a plurality of fenders respectively corresponding to the tires are formed, and comprises a plurality of groups of distance sensors respectively corresponding to the tires and the fenders and an arithmetic unit connected to the groups of the distance sensors. Coordinate of a portion of the front portion of the tire at which the tire expands the most outward along the direction of the side surface of the tire is detected as a first point, coordinate of a portion of the rear portion of the tire at which the tire expands the most outward along the direction of the side surface of the tire is detected as a second point, coordinate of a portion of the upper portion of the tire at which the tire expands the most outward along the direction of the side surface of the tire is detected as a third point, a centroid point of a triangle formed with the detected first, second and third points is employed as an evaluation point of the tire, coordinate of a portion of the fender at which the fender expands the most outward along the direction of the side surface of the body is detected as a fourth point, the detected fourth point is employed as an evaluation point of the fender, and the arithmetic unit detects the stopped state of the vehicle based on the coordinate of the evaluation point detected about each of the tires and the coordinate of the evaluation point detected about each of the fenders.

In one of the forms of exploitation of the present invention, preferably, the first point is detected by a front distance sensor scanning the front portion of the outer side surface of the corresponding tire, the second point is detected by a rear distance sensor scanning the rear portion of the outer side surface of the corresponding tire, the third point is detected by an upper distance sensor scanning the upper portion of the outer side surface of the corresponding tire, and the fourth point is detected by a fender part distance sensor scanning the corresponding fender.

In one of the forms of exploitation of the present invention, preferably, the fourth point is detected by the upper distance sensor also serving as the fender part distance sensor.

In one of the forms of exploitation of the present invention, preferably, each of the distance sensors is arranged at a position separated for a predetermined distance from the corresponding tire and detecting corresponding one of the first, second, third and fourth points non-contactingly.

In one of the forms of exploitation of the present invention, preferably, each of the distance sensors comprises laser sensors.

An alignment adjusting device according the third aspect of the present invention comprises the device for detecting the stopped state of the vehicle according the first aspect of the present invention, and the stopped state of the vehicle is adjusted based on the detection result of the stopped state of the vehicle by the device for detecting the stopped state of the vehicle.

In one of the forms of exploitation of the present invention, preferably, the arithmetic unit detects the gap between the detection result of the stopped state of the vehicle by the detection device and ideal stopped state of the vehicle, the arithmetic unit adjusts automatically the alignment of the vehicle when the gap is less than a predetermined threshold, and the arithmetic unit adjusts the stopped state of the vehicle when the gap is more than the threshold.

Advantageous Effects of Invention

The present invention constructed as the above brings the following effects.

According the first aspect of the present invention, the stopped state of the vehicle can be detected regardless of the size and shape of the vehicle, and the stopped state of the body and the stopped state of each of the tires can be detected respectively, whereby the stopped state of the vehicle can be detected accurately.

The number of distance sensors can be reduced so as to provide the detection device for the stopped state of the vehicle with easy construction.

The positioning of the vehicle can be performed easily.

The detection accuracy of the stopped state of the vehicle can be secured.

According the second aspect of the present invention, the stopped state of the body and the stopped state of each of the tires can be detected respectively, whereby the stopped state of the vehicle can be detected accurately.

The stopped state of the vehicle can be detected regardless of the size and shape of the vehicle.

The number of distance sensors can be reduced so as to provide the detection device for the stopped state of the vehicle with easy construction.

The positioning of the vehicle can be performed easily.

The detection accuracy of the stopped state of the vehicle can be secured.

According to the third aspect of the present invention, the stopped state of the vehicle can be detected regardless of the size and shape of the vehicle accurately, whereby the alignment adjustment work can be automated.

The adjuster is prevented from touching the body at the time of the alignment adjustment work.

DESCRIPTION OF EMBODIMENTS

Explanation will be given on entire construction of a vehicle stopped state detection device according to an embodiment of the present invention referring to FIGS. 1 to 4.

Figure 1:
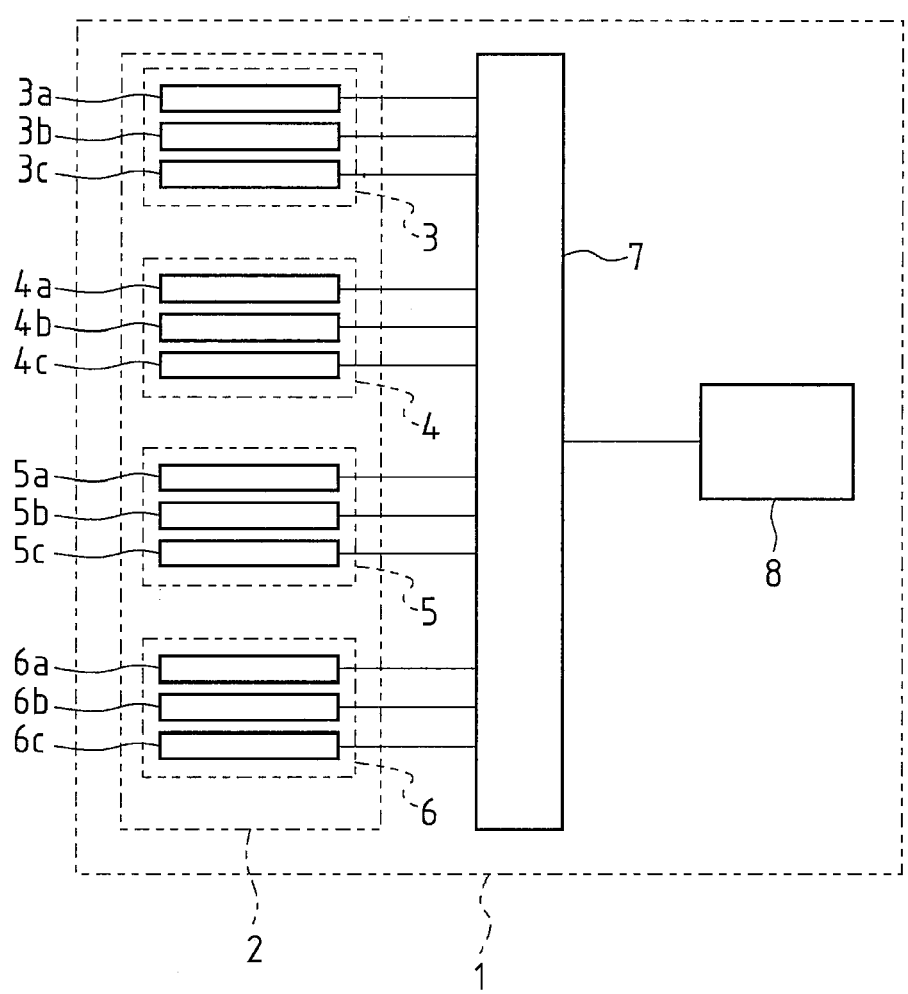
FIG. 1 is a block diagram of entire construction of a vehicle stopped state detection device according to an embodiment of the present invention.
Figure 2:
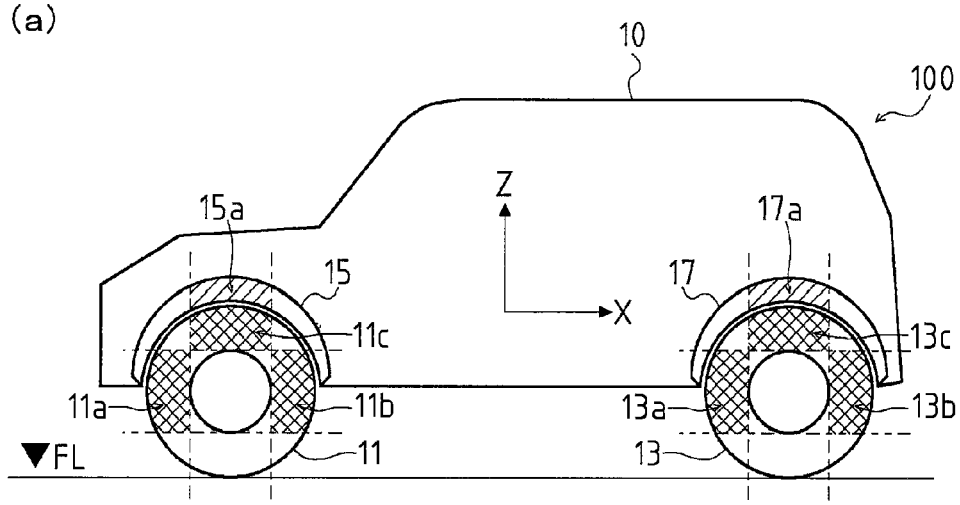
FIG. 2(a) is a schematic left side view of the entire construction of the vehicle stopped state detection device.
FIG. 2(b) is a schematic left side view of set conditions of a detection range of a method for detecting a stopped state of a vehicle.
Figure 2:
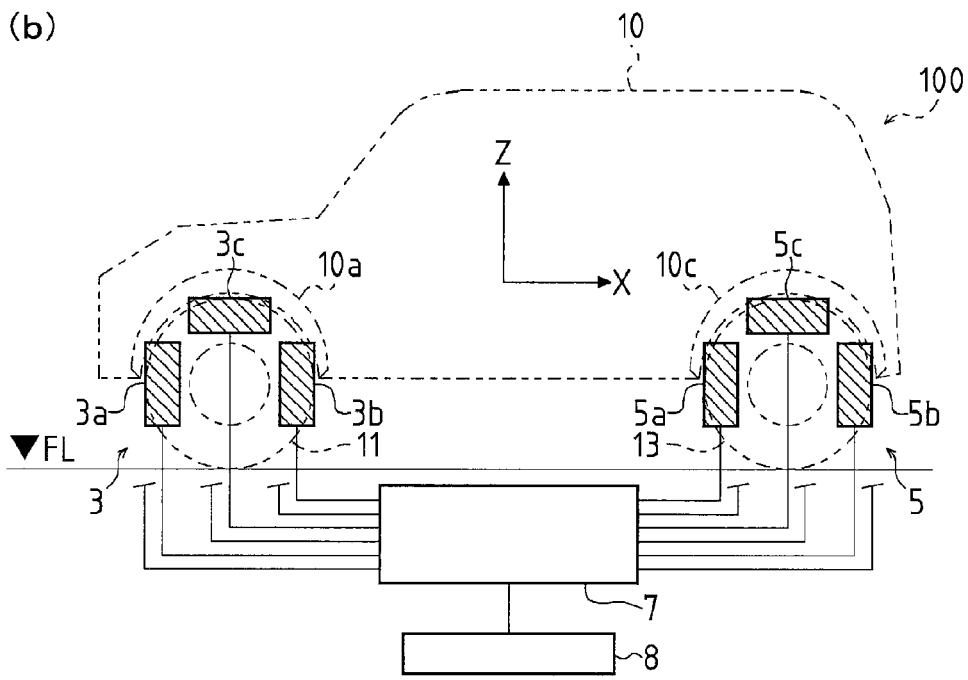
Figure 3:
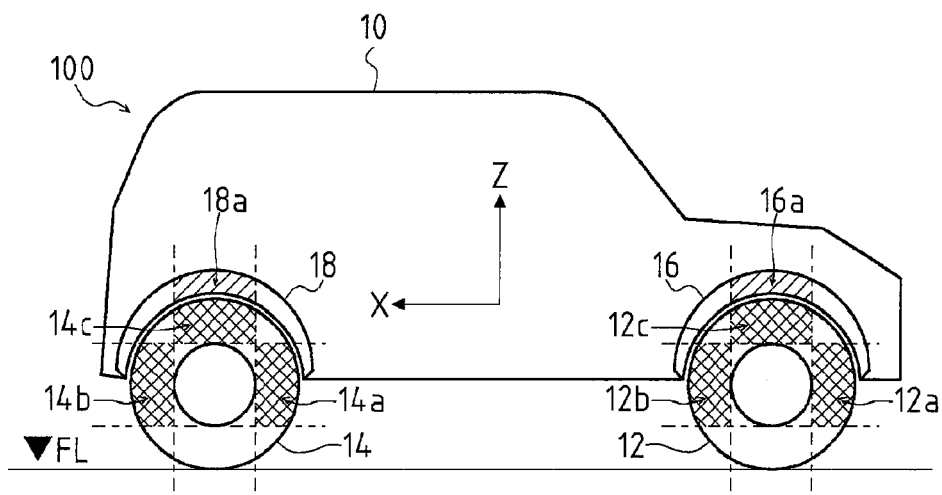
FIG. 3(a) is a schematic right side view of the entire construction of the vehicle stopped state detection device.
FIG. 3(b) is a schematic right side view of set conditions of a detection range of a method for detecting a stopped state of a vehicle.
Figure 3:
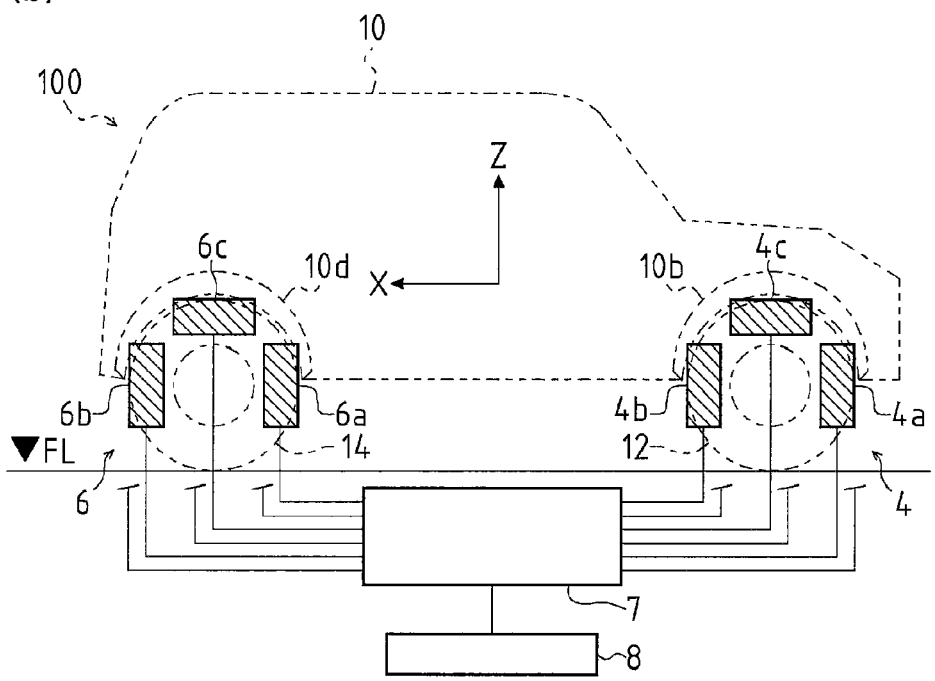
Figure 4:
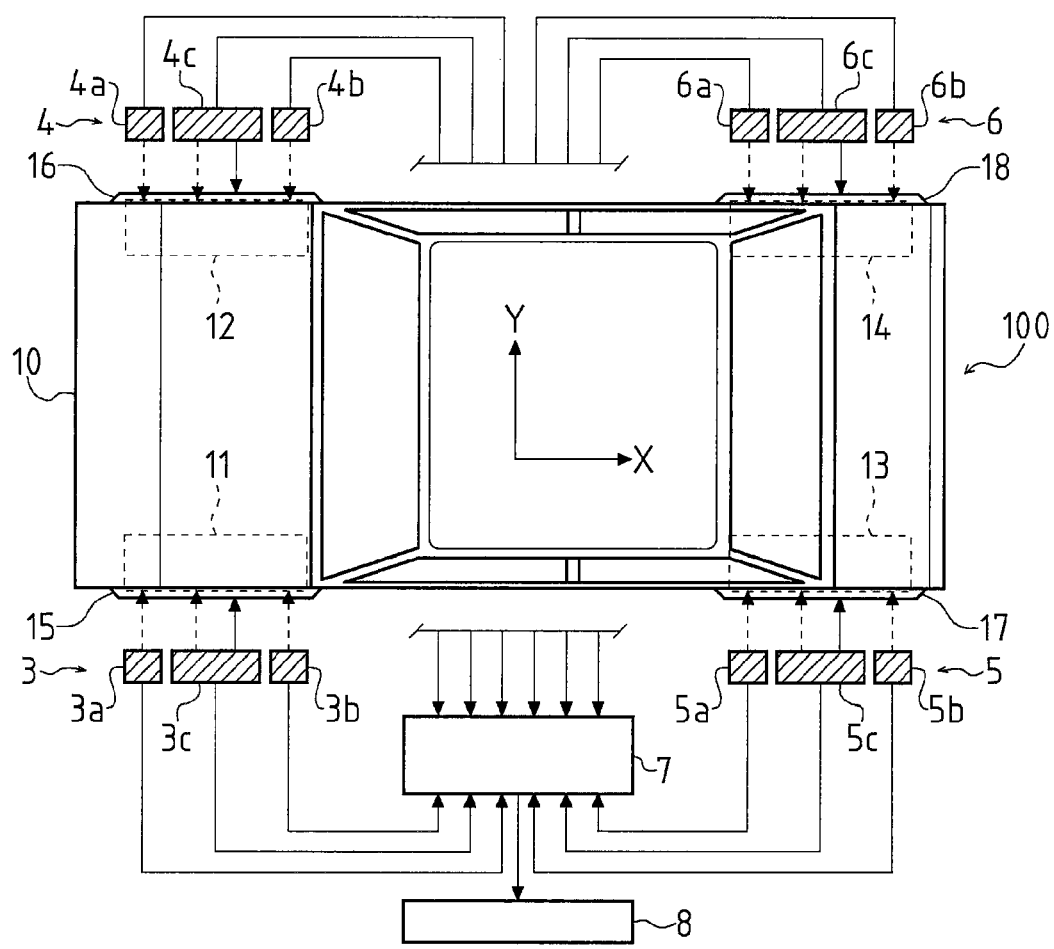
FIG. 4 is a schematic plan view of the entire construction of the vehicle stopped state detection device.

FIG. 1 is a block diagram of entire construction of a vehicle stopped state detection device according to an embodiment of the present invention. FIG. 2 is a schematic left side view of the entire construction of the vehicle stopped state detection device. FIG. 3 is a schematic right side view of the entire construction of the vehicle stopped state detection device. FIG. 4 is a schematic plan view of the entire construction of the vehicle stopped state detection device.

As shown in FIGS. 2 to 4, in this embodiment, for convenience of the explanation, a 3-dimensional coordinate system is prescribed. An X-axis corresponding to a lengthwise (longitudinal) direction, a Y-axis corresponding to a crosswise (lateral) direction, and a Z-axis corresponding to a height (vertical) direction are prescribed. The direction of rearward movement of the vehicle is regarded as the positive direction of the X-axis, the rightward direction about the forward movement of the vehicle (the negative direction of the X-axis) is regarded as the positive direction of the Y-axis, and the upward direction of the vehicle is regarded as the positive direction of the Z-axis.

As shown in FIG. 1, the vehicle stopped state detection device 1 detects stopped state of a vehicle and has a detection part 2, a controller 7, an arithmetic unit 8 and the like.

The detection part 2 detects directly the stopped state of the vehicle which is an object to be detected, and includes a plurality of groups of distance sensors 3, 4, 5 and 6. The groups of distance sensors 3, 4, 5 and 6 respectively include front distance sensors 3a, 4a, 5a and 6a, rear distance sensors 3b, 4b, 5b and 6b, and upper distance sensors 3c, 4c, 5c and 6c.

The controller 7 accumulates signals detected by the distance sensors (the front distance sensors 3a, 4a, 5a and 6a, the rear distance sensors 3b, 4b, 5b and 6b, and the upper distance sensors 3c, 4c, 5c and 6c) and processes the signals synchronously. Each of the distance sensors is connected to the controller 7.

The controller 7 is connected to the arithmetic unit 8 including a PC or the like.

An operation program for calculating the stopped state of the vehicle based on the signals inputted from the controller 7 is installed in the arithmetic unit 8, and basic data required for calculating the stopped state of the vehicle (data of body shape, data of tire shape and the like corresponding to types of vehicles) is previously stored in the arithmetic unit 8.

As shown in FIGS. 2(a) and 3(a), the vehicle 100 to which the detection method of vehicle stopped state according to the embodiment of the present invention is adopted includes a left-front tire 11 disposed at the left-front side of the vehicle 100, a right-front tire 12 disposed at the right-front side of the vehicle 100, a left-rear tire 13 disposed at the left-rear side of the vehicle 100, and a right-rear tire 14 disposed at the right-rear side of the vehicle 100 about the forward travel direction (negative direction of the X-axis), and a body 10 supported by the tires 11, 12, 13 and 14.

In this embodiment, as regions showing parts of outside surfaces of the tires 11, 12, 13 and 14, regions referred to as front portions 11a, 12a, 13a and 14a, rear portions 11b, 12b, 13b and 14b, and upper portions 11c, 12c, 13c and 14c are set.

In this embodiment, upper and lower two horizontal tangential lines and front and rear two vertical tangential lines are set about the inner peripheral circle of each of the tires 11, 12, 13 and 14, and the region of the outside surface enclosed by an arc of the outer peripheral circle of each of the tires 11, 12, 13 and 14 at the front side of the vehicle, the upper and lower two horizontal tangential lines and the front vertical tangential line is prescribed as corresponding one of the front portions 11a, 12a, 13a and 14a.

The region of the outside surface enclosed by an arc of the outer peripheral circle of each of the tires 11, 12, 13 and 14 at the rear side of the vehicle, the upper and lower two horizontal tangential lines and the rear vertical tangential line is prescribed as corresponding one of the rear portions 11b, 12b, 13b and 14b. Furthermore, the region of the outside surface enclosed by an arc of the outer peripheral circle of each of the tires 11, 12, 13 and 14 at the upper side of the vehicle, the front and rear two vertical tangential lines and the upper horizontal tangential line is prescribed as corresponding one of the upper portions 11c, 12c, 13c and 14c.

By forecasting the region in which a detection point is obtained based on the data of tire shape and the like, the region (that is, the front portions 11a, 12a, 13a and 14a, the rear portions 11b, 12b, 13b and 14b and the upper portions 11c, 12c, 13c and 14c) can be set more narrowly. In this case, the detection accuracy and detection speed (operation speed) of the detection point is improved.

In this embodiment, as shown in FIGS. 2(a) and 3(a), as regions showing parts of outside surfaces of fenders 15, 16, 17 and 18 formed in the body 10 of the vehicle 100, regions referred to as fender parts 15a, 16a, 17a and 18a are set.

In this embodiment, in the outside surface of each of the fenders 15, 16, 17 and 18, the region enclosed by the front and rear two vertical tangential lines set about the inner peripheral circle of corresponding one of the tires 11, 12, 13 and 14 is prescribed as the fender part 15a, 16a, 17a and 18a. Namely, each of the fender parts 15a, 16a, 17a and 18a is set above corresponding one of the upper portions 11c, 12c, 13c and 14c at the same longitudinal position as that of the corresponding one of the upper portions 11c, 12c, 13c and 14c.

By forecasting the region in which a detection point is obtained based on the data of body shape and the like, the fender parts 15a, 16a, 17a and 18a can be set more narrowly. In this case, the detection accuracy and detection speed (operation speed) of the detection point is improved.

As shown in FIGS. 2(b), 3(b) and 4, in the vehicle stopped state detection device 1, in the vicinity of each of the tires 11, 12, 13 and 14, the distance sensors (corresponding one of the front distance sensors 3a, 4a, 5a and 6a, corresponding one of the rear distance sensors 3b, 4b, 5b and 6b, and corresponding one of the upper distance sensors 3c, 4c, 5c and 6c) are arranged.

Namely, as shown in FIG. 2, in the vicinity of the left-front tire 11, the group of the distance sensors 3 is disposed corresponding to the left-front tire 11. The front distance sensor 3a is disposed corresponding to the front portion 11a of the outside surface of the left-front tire 11, the rear distance sensor 3b is disposed corresponding to the rear portion 11b, and the upper distance sensor 3c is disposed corresponding to the upper portion 11c.

Then, the distance sensors 3a, 3b and 3c can scan the corresponding regions (that is, the front portion 11a, the rear portion 11b and the upper portion 11c).

As shown in FIG. 3, in the vicinity of the right-front tire 12, the group of the distance sensors 4 is disposed corresponding to the right-front tire 12. The front distance sensor 4a is disposed corresponding to the front portion 12a of the outside surface of the right-front tire 12, the rear distance sensor 4b is disposed corresponding to the rear portion 12b, and the upper distance sensor 4c is disposed corresponding to the upper portion 12c.

Then, the distance sensors 4a, 4b and 4c can scan the corresponding regions (that is, the front portion 12a, the rear portion 12b and the upper portion 12c).

As shown in FIG. 2, in the vicinity of the left-rear tire 13, the group of the distance sensors 5 is disposed corresponding to the left-rear tire 13. The front distance sensor 5a is disposed corresponding to the front portion 13a of the outside surface of the left-rear tire 13, the rear distance sensor 5b is disposed corresponding to the rear portion 13b, and the upper distance sensor 5c is disposed corresponding to the upper portion 13c.

Then, the distance sensors 5a, 5b and 5c can scan the corresponding regions (that is, the front portion 13a, the rear portion 13b and the upper portion 13c).

As shown in FIG. 3, in the vicinity of the right-rear tire 14, the group of the distance sensors 6 is disposed corresponding to the right-rear tire 14. The front distance sensor 6a is disposed corresponding to the front portion 14a of the outside surface of the right-rear tire 14, the rear distance sensor 6b is disposed corresponding to the rear portion 14b, and the upper distance sensor 6c is disposed corresponding to the upper portion 14c.

Then, the distance sensors 6a, 6b and 6c can scan the corresponding regions (that is, the front portion 14a, the rear portion 14b and the upper portion 14c).

As each of the distance sensors (corresponding one of the front distance sensors 3a, 4a, 5a and 6a, corresponding one of the rear distance sensors 3b, 4b, 5b and 6b, and corresponding one of the upper distance sensors 3c, 4c, 5c and 6c), a non-contact distance sensor is adopted and arranged at a predetermined distance from corresponding one of the tires 11, 12, 13 and 14.

According to the construction, the positioning of the vehicle 100 can be performed easily.

Next, explanation will be given on detection condition of vehicle stopped state by the vehicle stopped state detection device 1 referring to FIG. 5.

Figure 5:
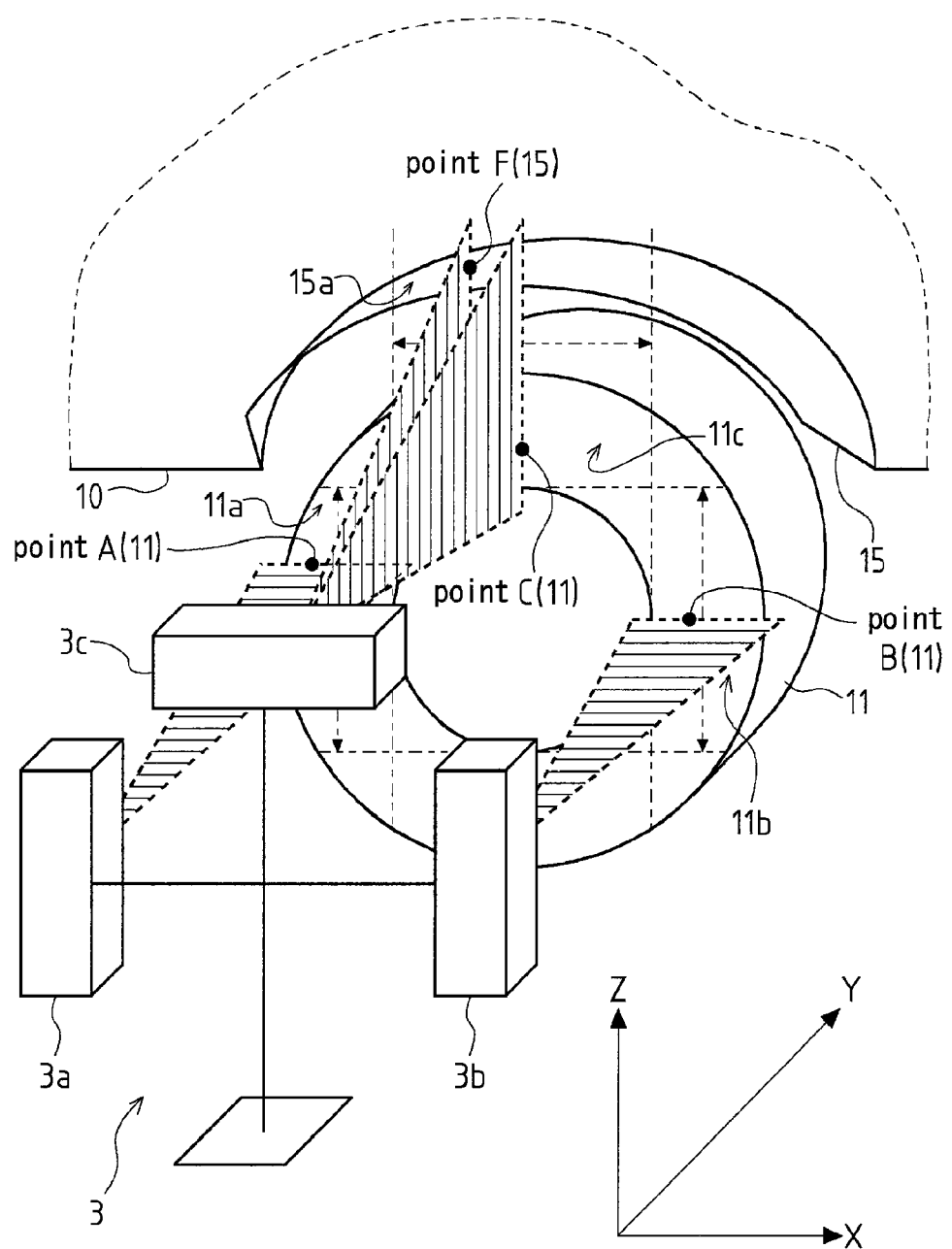
FIG. 5 is a perspective view of detection condition of vehicle stopped state by the vehicle stopped state detection device.

FIG. 5 is a perspective view of detection condition of vehicle stopped state by the vehicle stopped state detection device according to the embodiment of the present invention. Herein, explanation will be given on the detection condition of vehicle stopped state in the vicinity of the left-front tire 11 as the representation of the tires 11, 12, 13 and 14. However, the detection condition of vehicle stopped state in the vicinity of each of the other tires 12, 13 and 14 is similar and the explanation of the tires 12, 13 and 14 is omitted for convenience.

As shown in FIG. 5, the front distance sensor 3a scans the front portion 11a of the left-front tire 11 completely and measures the distance between the front distance sensor 3a and the front portion 11a. Then, the results of measurement are inputted into the arithmetic unit 8.

Subsequently, based on the results of measurement by the front distance sensor 3a, the arithmetic unit 8 performs the operation so as to detect the surface shape of the front portion 11a.

Furthermore, based on the detected surface shape of the front portion 11a, the arithmetic unit 8 detects the point A which expands the most outward along the outside surface direction of the left-front tire 11 (along the negative direction of the Y-axis) in the front portion 11a (in other words, the point in the front portion 11a which is the most close to the front distance sensor 3a). For distinguishing what tire the point A is detected about, hereinafter, the point detected about the front portion 11a of the left-front tire 11 is referred to as the point A(11). Similarly, the point detected about the front portion 12a of the right-front tire 12 is referred to as the point A(12), the point detected about the front portion 13a of the left-rear tire 13 is referred to as the point A(13), and the point detected about the front portion 14a of the right-rear tire 14 is referred to as the point A(14).

Simultaneously with the measurement by the front distance sensor 3a, the rear distance sensor 3b scans the rear portion 11b of the left-front tire 11 completely and measures the distance between the rear distance sensor 3b and the rear portion 11b. Then, the results of measurement are inputted into the arithmetic unit 8.

Subsequently, based on the results of measurement by the rear distance sensor 3b, the arithmetic unit 8 performs the operation so as to detect the surface shape of the rear portion 11b.

Furthermore, based on the detected surface shape of the rear portion 11b, the arithmetic unit 8 detects the point B which expands the most outward along the outside surface direction of the left-front tire 11 (along the negative direction of the Y-axis) in the rear portion 11b (in other words, the point in the rear portion 11b which is the most close to the rear distance sensor 3b). For distinguishing what tire the point B is detected about, hereinafter, the point detected about the rear portion 11b of the left-front tire 11 is referred to as the point B(11). Similarly, the point detected about the rear portion 12b of the right-front tire 12 is referred to as the point B(12), the point detected about the rear portion 13b of the left-rear tire 13 is referred to as the point B(13), and the point detected about the rear portion 14b of the right-rear tire 14 is referred to as the point B(14).

Furthermore, simultaneously with the measurement by the front distance sensor 3a and the rear distance sensor 3b, the upper distance sensor 3c scans the upper portion 11c of the left-front tire 11 completely and measures the distance between the upper distance sensor 3c and the upper portion 11c. Then, the results of measurement are inputted into the arithmetic unit 8.

Subsequently, based on the results of measurement by the upper distance sensor 3c, the arithmetic unit 8 performs the operation so as to detect the surface shape of the upper portion 11c.

Furthermore, based on the detected surface shape of the upper portion 11c, the arithmetic unit 8 detects the point C which expands the most outward along the outside surface direction of the left-front tire 11 (along the negative direction of the Y-axis) in the upper portion 11c (in other words, the point in the upper portion 11c which is the most close to the upper distance sensor 3c). For distinguishing what tire the point C is detected about, hereinafter, the point detected about the upper portion 11c of the left-front tire 11 is referred to as the point C(11). Similarly, the point detected about the upper portion 12c of the right-front tire 12 is referred to as the point C(12), the point detected about the upper portion 13c of the left-rear tire 13 is referred to as the point C(13), and the point detected about the upper portion 14c of the right-rear tire 14 is referred to as the point C(14).

Simultaneously with the completely scanning of the upper portion 11c, the upper distance sensor 3c scans the fender part 15a of the left-front fender 15 completely and measures the distance between the upper distance sensor 3c and the fender part 15a. Then, the results of measurement are inputted into the arithmetic unit 8.

Furthermore, based on the detected surface shape of the fender part 15a, the arithmetic unit 8 detects the point F which expands the most outward along the outside surface direction of the left-front tire 11 (along the negative direction of the Y-axis) in the fender part 15a (in other words, the point in the fender part 15a which is the most close to the upper distance sensor 3c). For distinguishing what tire the point F is detected about, hereinafter, the point detected about the fender part 15a of the left-front fender 15 is referred to as the point F(15). Similarly, the point detected about the upper portion 16a of the right-front fender 16 is referred to as the point F(16), the point detected about the upper portion 17a of the left-rear fender 17 is referred to as the point F(17), and the point detected about the upper portion 18a of the right-rear fender 18 is referred to as the point F(18).

Namely, in this embodiment, the upper distance sensors 3c, 4c, 5c and 6c also serve as distance sensors corresponding to the fender parts 15a, 16a, 17a and 18a respectively (that is, fender part distance sensors).

According to the construction, the number of distance sensors can be reduced so as to provide the vehicle stopped state detection device 1, which is used in the method for detecting vehicle stopped state, with easy construction.

In this embodiment, laser sensors are employed as the distance sensors (that is, the front distance sensors 3a, 4a, 5a and 6a, corresponding one of the rear distance sensors 3b, 4b, 5b and 6b, and corresponding one of the upper distance sensors 3c, 4c, 5c and 6c). Accordingly, detection accuracy required for detecting minute change of shape appearing in the regions (that is, the front portions 11a, 12a, 13a and 14a, the rear portions 11b, 12b, 13b and 14b and the upper portions 11c, 12c, 13c and 14c) is secured.

According to the construction, the detection accuracy of the stopped state of the vehicle 100 is secured.

Next, explanation will be given on detection method of vehicle stopped state according to the embodiment of the present invention referring to FIGS. 6 and 7.

Figure 6:
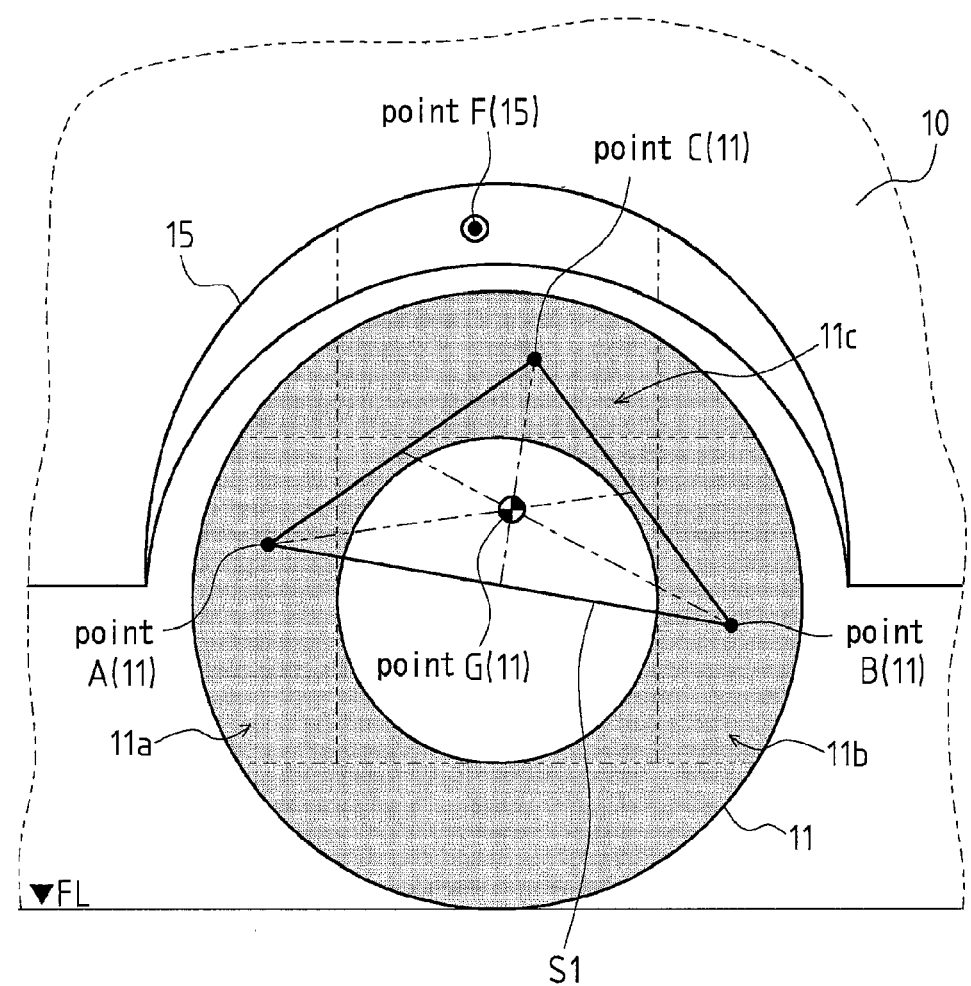
FIG. 6 is an explanation drawing of a detection method of an evaluating point.

FIG. 6 is an explanation drawing of a detection method of vehicle stopped state according to the embodiment of the present invention. FIG. 7 is a schematic drawing of a detection method of vehicle stopped state according to the embodiment of the present invention.

As shown in FIG. 6, about the left-front tire 11, a triangle S1 is formed with the points A(11), B(11) and C(11) measured by the group of the distance sensors 3 and detected by the arithmetic unit 8.

In this embodiment, the arithmetic unit 8 calculates a three dimensional coordinate of a centroid point G(11) of the triangle S1, and the centroid point G(11) is employed as an evaluation point of the left-front tire 11. Then, the stopped state of the left-front tire 11 is detected with the three dimensional coordinate of the centroid point G(11) and the shape data of the left-front tire 11 previously stored in the arithmetic unit 8.

The concept of the stopped state in this case includes the longitudinal and lateral stopped position of the tire, the crushed condition of the tire caused by change of air pressure, and stopped posture of the tire changed by the steering angle (rudder angle) of the tire or the like.

Similarly, about the right-front tire 12, a triangle S2 is formed with the points A(12), B(12) and C(12) measured by the group of the distance sensors 4 and detected by the arithmetic unit 8, and the arithmetic unit 8 calculates a three dimensional coordinate of a centroid point G(12) of the triangle S2. The centroid point G(12) is employed as an evaluation point of the right-front tire 12. Then, the stopped state of right-front tire 12 is detected with the three dimensional coordinate of the centroid point G(12) and the shape data of the right-front tire 12 previously stored in the arithmetic unit 8.

Similarly, about the left-rear tire 13, a triangle S3 is formed with the points A(13), B(13) and C(13) measured by the group of the distance sensors 5 and detected by the arithmetic unit 8, and the arithmetic unit 8 calculates a three dimensional coordinate of a centroid point G(13) of the triangle S3. The centroid point G(13) is employed as an evaluation point of the left-rear tire 13. Then, the stopped state of left-rear tire 13 is detected with the three dimensional coordinate of the centroid point G(13) and the shape data of the left-rear tire 13 previously stored in the arithmetic unit 8.

Similarly, about the right-rear tire 14, a triangle S4 is formed with the points A(14), B(14) and C(14) measured by the group of the distance sensors 6 and detected by the arithmetic unit 8, and the arithmetic unit 8 calculates a three dimensional coordinate of a centroid point G(14) of the triangle S4. The centroid point G(14) is employed as an evaluation point of the right-rear tire 14. Then, the stopped state of right-rear tire 14 is detected with the three dimensional coordinate of the centroid point G(14) and the shape data of the right-rear tire 14 previously stored in the arithmetic unit 8.

About the fenders 15, 16, 17 and 18, the points F(15), F(16), F(17) and F(18) measured by the upper distance sensors 3c, 4c, 5c and 6c and detected by the arithmetic unit 8 are employed as evaluation points of the fenders 15, 16, 17 and 18 respectively. By comparing the three dimensional coordinates of the points F with the shape data of the body 10 previously stored in the arithmetic unit 8, the stopped state of the body 10 is detected.

In the detection method of vehicle stopped state according to the embodiment of the present invention, the points A(11), A(12), A(13) and A(14) as the first points are detected respectively by the front distance sensors 3a, 4a, 5a and 6a which scan the front portions 11a, 12a, 13a and 14a of the outside surfaces of the tires 11, 12, 13 and 14. The points B(11), B(12), B(13) and B(14) as the second points are detected respectively by the rear distance sensors 3b, 4b, 5b and 6b which scan the rear portions 11b, 12b, 13b and 14b of the outside surfaces of the tires 11, 12, 13 and 14. The points C(11), C(12), C(13) and C(14) as the third points are detected respectively by the upper distance sensors 3c, 4c, 5c and 6c which scan the upper portions 11c, 12c, 13c and 14c of the outside surfaces of the tires 11, 12, 13 and 14. The points F(15), F(16), F(17) and F(18) as the fourth points are detected respectively by the upper distance sensors 3c, 4c, 5c and 6c which function as fender portion sensors scanning the fenders 15, 16, 17 and 18.

According to the construction, the stopped state of the vehicle 100 can be detected regardless of the size and shape of the vehicle 100, whereby the stopped state of the vehicle 100 can be detected accurately.

Figure 7:
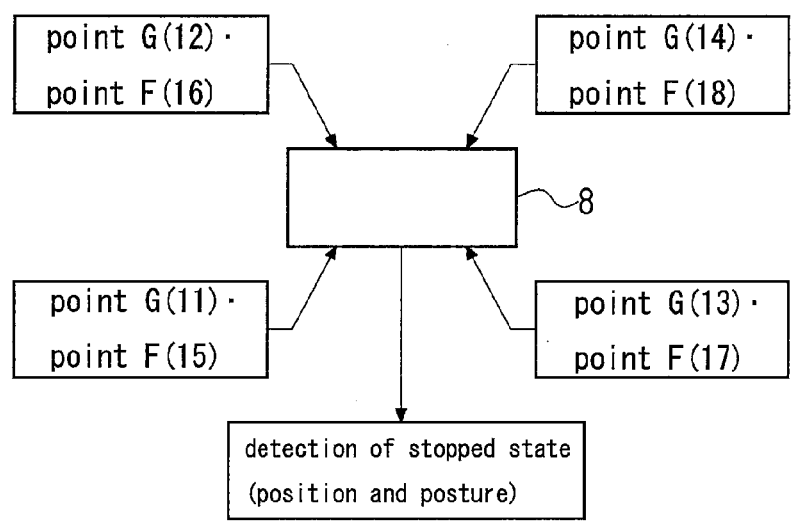
FIG. 7 is a schematic drawing of a detection method of stopped state of a vehicle. (a) shows the detection method of the stopped state. (b) illustrates the stopped state that only a body is slanted.
Figure 7:
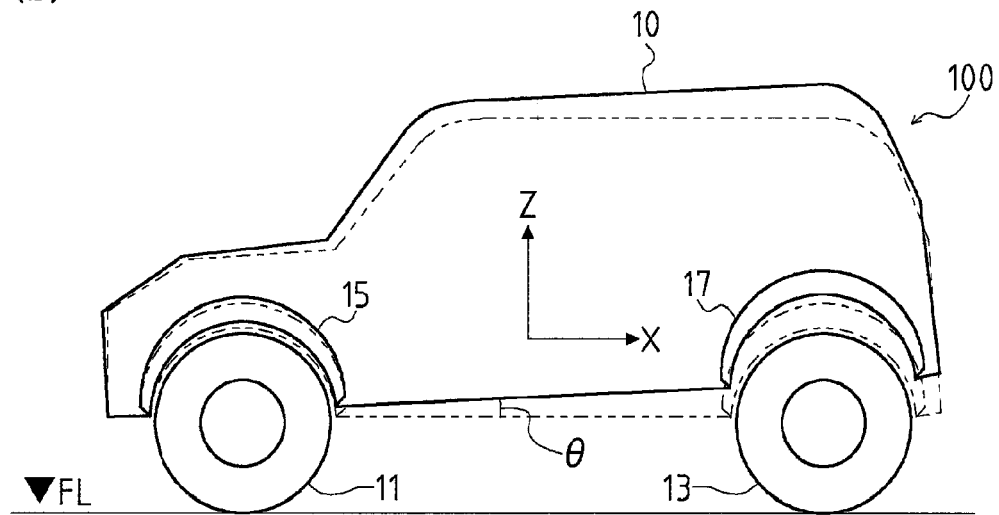

As shown in FIG. 7, total eight points of the three dimensional coordinates, the centroid point G(11) detected about the left-front tire 11, the centroid point G(12) detected about the right-front tire 12, the centroid point G(13) detected about the left-rear tire 13, the centroid point G(14) detected about the right-rear tire 14, and the points F(15), F(16), F(17) and F(18) respectively detected about the fenders 15, 16, 17 and 18 are used collectively so that the arithmetic unit 8 detects the stopped state of the vehicle 100.

According to the detection method of vehicle stopped state according to the embodiment of the present invention, the stopped state of the body 10 and the stopped state of each of the tires 11, 12, 13 and 14 can be detected independently. Then, for example as shown in FIG. 7(b), the stopped state of the vehicle 100 that only the body 10 is rotated centering on the Y-axis (along so-called pitch direction) can be detected accurately.

As shown in this embodiment, the present invention is adopted to a general vehicle with four wheels. However, by the application of the present invention, invention can be adopted easily to a vehicle that the number of tires (wheels) is not four.

Namely, the detection device of vehicle stopped state according to the embodiment of the present invention (that is, the vehicle stopped state detection device 1), which detects the stopped state of the vehicle 100 having a plurality of tires (that is, the tires 11, 12, 13 and 14) and the body 10 in which the fenders respectively corresponding to the tires (that is, the fenders 15, 16, 17 and 18) are formed, includes a plurality of groups of the distance sensors respectively corresponding to the tires 11, 12, 13 and 14 and the fenders 15, 16, 17 and 18 (that is, the groups of distance sensors 3, 4, 5 and 6) and the arithmetic unit 8 connected to the groups of distance sensors 3, 4, 5 and 6. For example, illustrating with the group of distance sensors 3, the detection device includes the front distance sensor 3a which scans the front portion 11a of the outside surface of the left-front tire 11 corresponding to the group of distance sensors 3 and detects the coordinate of the portion of the front portion 11a at which the left-front tire 11 expands the most outward along the direction of the side surface of the left-front tire 11 as the first point A(11), the rear distance sensor 3b which scans the rear portion 11b of the outside surface of the left-front tire 11 corresponding to the group of distance sensors 3 and detects the coordinate of the portion of the rear portion 11b at which the left-front tire 11 expands the most outward along the direction of the side surface of the left-front tire 11 as the second point B(11), the upper distance sensor 3c which scans the upper portion 11c of the outside surface of the left-front tire 11 corresponding to the group of distance sensors 3 and detects the coordinate of the portion of the rear portion 11b at which the left-front tire 11 expands the most outward along the direction of the side surface of the left-front tire 11 as the third point C(11), and the upper distance sensor 3c which scans the fender part 15a of the left-front fender 15 corresponding to the group of distance sensors 3 and detects the coordinate of the portion of the fender part 15a at which the left-front fender 15 expands the most outward along the direction of the side surface of the body 10 as the fourth point F(15). The arithmetic unit 8 detects the evaluation point of the left-front tire 11 (that is, the point G(11)) based on the coordinate of the centroid point G(11) of the triangle S1 formed with the points A(11), B(11) and C(11) measured by the group of distance sensors 3 as apexes, and detects the evaluation point of the left-front fender 15 (that is, the point F(15)) based on the coordinate of the point F(15). Based on the coordinates of the point G(11) which is the evaluation point detected about the left-front tire 11 and the points G(12), G(13) and G(14) detected about the other tires 12, 13 and 14 and the coordinates of the point F(15) which is the evaluation point detected about the left-front fender 15 and the points F(16), F(17) and F(18) detected about the other fenders 16, 17 and 18, the stopped state of the vehicle 100 is detected.

The detection method of vehicle stopped state according to the embodiment of the present invention, which detects the stopped state of the vehicle 100 having a plurality of tires (that is, the tires 11, 12, 13 and 14) and the body 10 in which the fenders respectively corresponding to the tires (that is, the fenders 15, 16, 17 and 18) are formed, includes a plurality of groups of the distance sensors respectively corresponding to the tires 11, 12, 13 and 14 and the fenders 15, 16, 17 and 18 (that is, the groups of distance sensors 3, 4, 5 and 6) and the arithmetic unit 8 connected to the groups of distance sensors 3, 4, 5 and 6. For example, illustrating with the group of distance sensors 3, the coordinate of the portion of the front portion 11a of the left-front tire 11 at which the left-front tire 11 expands the most outward along the direction of the side surface of the left-front tire 11 is detected as the first point A(11), the coordinate of the portion of the rear portion 11b of the left-front tire 11 at which the left-front tire 11 expands the most outward along the direction of the side surface of the left-front tire 11 is detected as the second point B(11), the coordinate of the portion of the upper portion 11c of the left-front tire 11 at which the left-front tire 11 expands the most outward along the direction of the side surface of the left-front tire 11 is detected as the third point C(11), and the centroid point G(11) of the triangle S1 formed with the detected points A(11), B(11) and C(11) is employed as the evaluation point of the left-front tire 11. The coordinate of the portion of the fender part 15a of the left-front fender 15 at which the left-front fender 15 expands the most outward along the direction of the side surface of the body 10 is detected as the fourth point F(15), and the detected point F(15) is employed as the evaluation point of the left-front fender 15. Based on the coordinates of the evaluation points respectively detected about the tires 11, 12, 13 and 14 (that is, the points G(11), G(12), G(13) and G(14)) and the coordinates of the evaluation points respectively detected about the fenders 15, 16, 17 and 18 (that is, the points F(15), F(16), F(17) and F(18)), the arithmetic unit 8 detects the stopped state of the vehicle 100.

According to the construction, the stopped state of the vehicle 100 can be detected regardless of the size and shape of the vehicle 100, and the stopped state of the body 10 and the stopped state of each of the tires 11, 12, 13 and 14 can be detected respectively, whereby the stopped state of the vehicle 100 can be detected accurately.

Next, explanation will be given on an alignment adjusting device according to an embodiment of the present invention referring to FIGS. 8 and 9.

Figure 8:
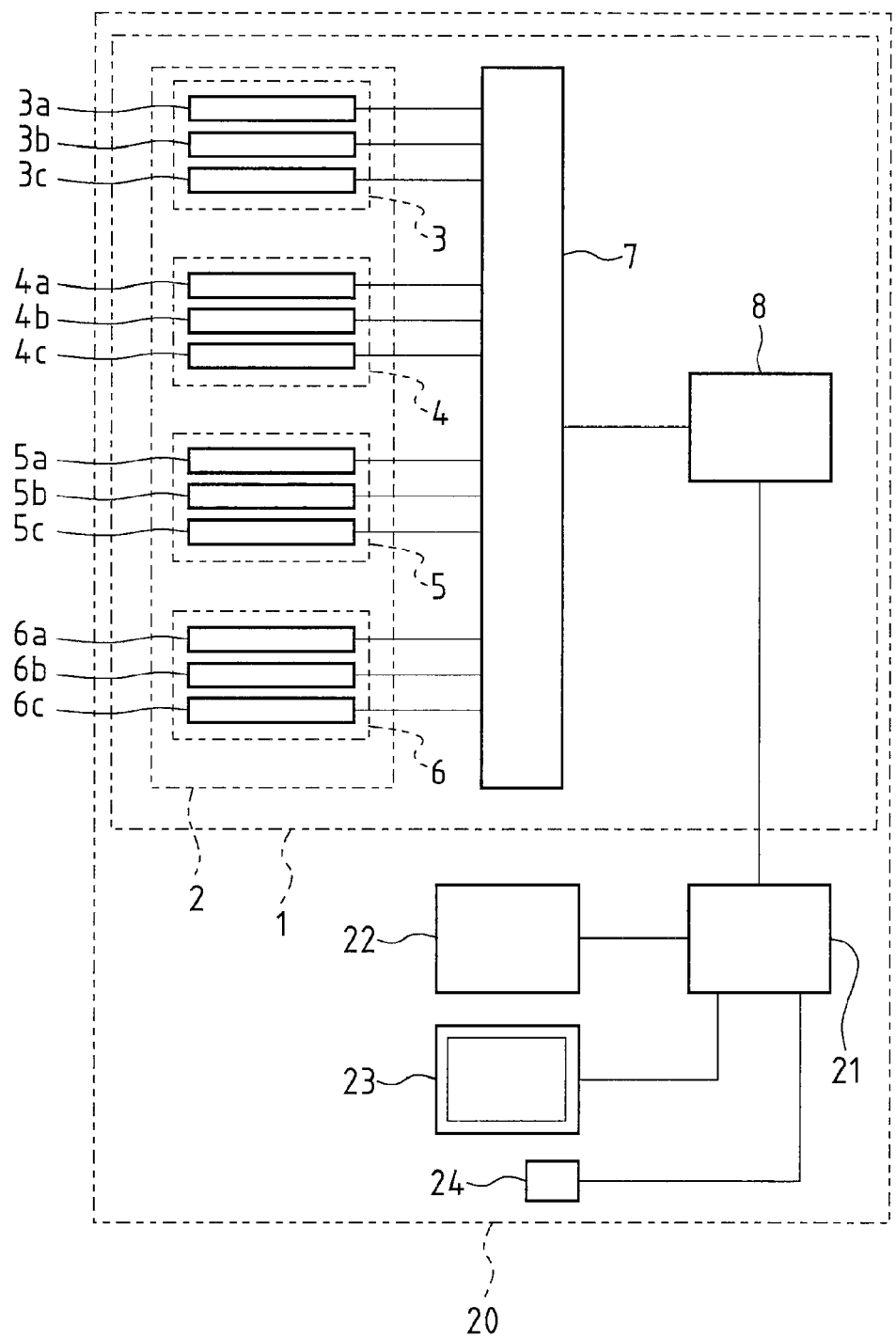
FIG. 8 is a block diagram of entire construction of an alignment adjusting device according to an embodiment of the present invention.
Figure 9:
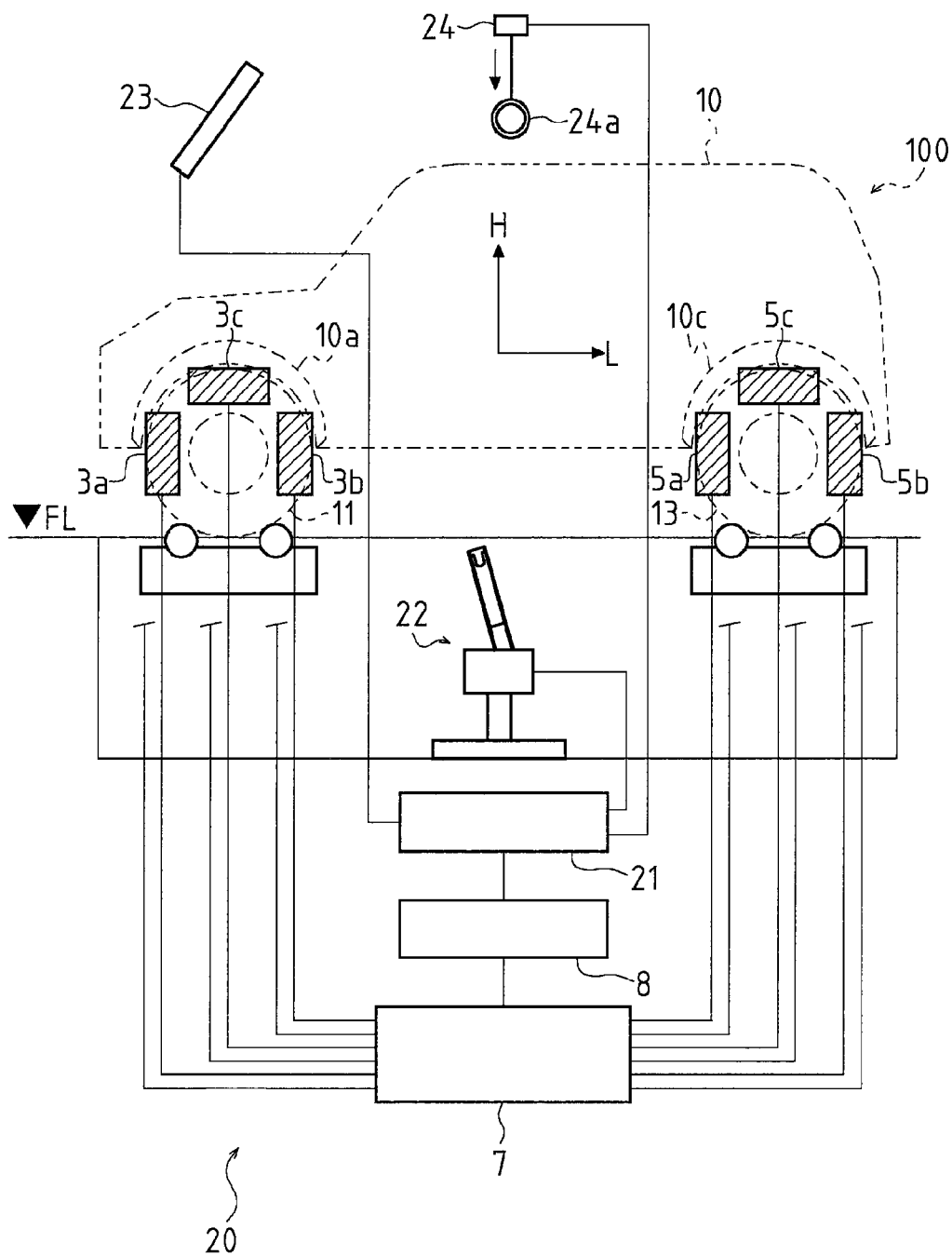
FIG. 9 is a schematic side view of the entire construction of the alignment adjusting device.

FIG. 8 is a block diagram of entire construction of the alignment adjusting device according to the embodiment of the present invention. FIG. 9 is a schematic side view of the entire construction of the alignment adjusting device according to the embodiment of the present invention.

The alignment adjusting device adjusts a toe angle of each of tires of a vehicle and includes a toe angle detection device detecting the toe angle. The toe angle detection device only detects the toe angle, and the adjusting work of the toe angle has not been automated and is performed by an operator generally.

As shown in FIG. 8, the alignment adjusting device 20 includes the above-mentioned vehicle stopped state detection device 1, and additionally includes a controller 21, an adjuster 22, a monitor 23, an operation switch 24 and the like. In this embodiment, the detection part 2 provided in the vehicle stopped state detection device 1 also serves as the above-mentioned toe angle detection device.

The controller 21 controls each part of the alignment adjusting device 20 (for example, the adjuster 22) and is connected to the arithmetic unit 8. The result of the stopped state of the vehicle detected by the vehicle stopped state detection device 1 is inputted from the arithmetic unit 8 into the controller 21.

Figure 11:
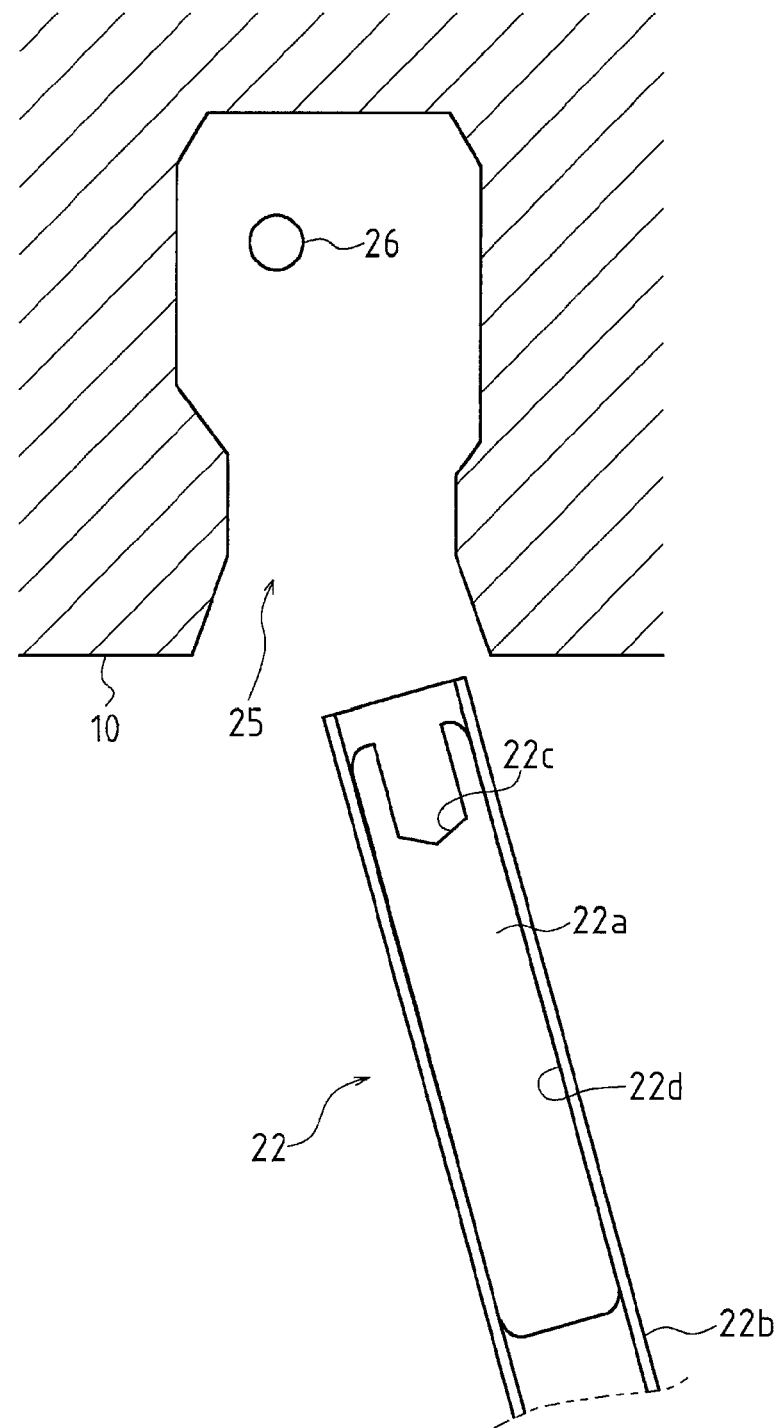
FIG. 11 is a schematic side view of automatic adjustment condition of a toe angle with the alignment adjusting device (before adjustment).

The adjuster 22 is controlled based on control signals transmitted from the controller 21. As shown in FIG. 11, the adjuster 22 shown in this embodiment includes a slide part 22a having a tool part 22c which functions as a tool fastening and loosening bolts, nuts and the like and a robot part 22b functioning as a robot which guides the tool part 22c to a desired position. The adjuster 22 is controlled by the controller 21 so as to adjust automatically fastening condition of the bolt or nut positioned at an optional position.

In this embodiment, the adjuster 22 is illustrated which has an easy mechanism that the slide part 22a is slid along a guide 22d of the robot part 22b. However, it may alternatively be constructed that the robot part 22b is an articulated robot arm and the tool part may be provided in the tip of the robot arm.

The monitor 23 is a display device connected to the controller 21 and displays the vehicle stopped state detection device 1 inputted into the controller 21 so that an operator which adjusts the alignment can know the stopped state of the vehicle and the like.

The operation switch 24 is connected to the controller 21 and includes an operation part 24a which can be operated by an operator in the vicinity of the vehicle 100. When the operator confirms the stopped state of the vehicle and operates the operation switch 24, the automatic control of the adjuster 22 by the controller 21 is permitted for the first time.

Next, explanation will be given on the automatic adjusting condition of the alignment by the alignment adjusting device 20 referring to FIGS. 10 to 12.

Figure 10:
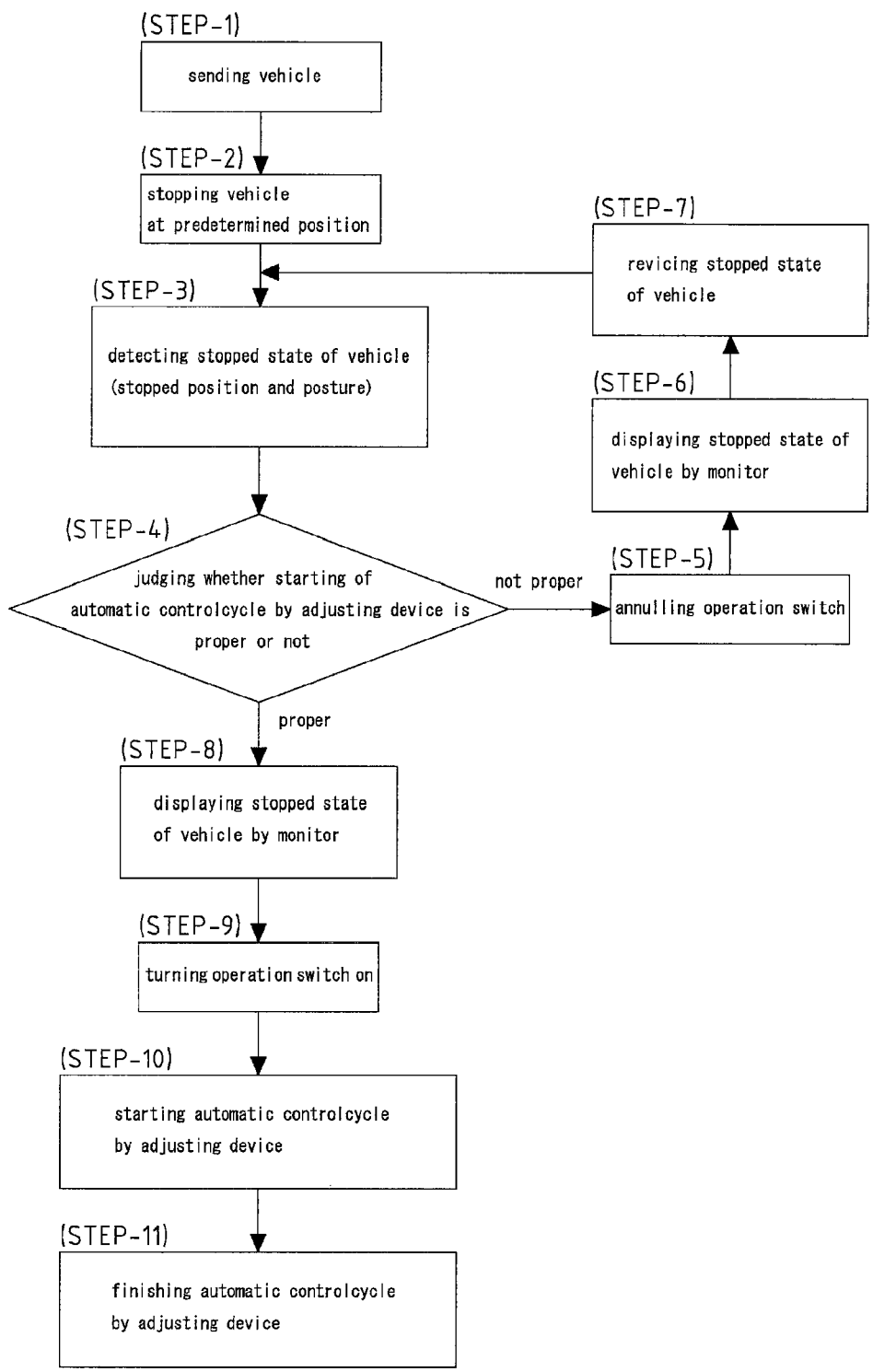
FIG. 10 is a flow chart of alignment adjusting work with the alignment adjusting device.

FIG. 10 is a flow chart of alignment adjusting work with the alignment adjusting device according to the embodiment of the present invention. FIG. 11 is a schematic side view of automatic adjustment condition of a toe angle with the alignment adjusting device according to the embodiment of the present invention (before adjustment). FIG. 12 is a schematic side view of automatic adjustment condition of a toe angle with the alignment adjusting device according to the embodiment of the present invention (under adjustment).

As shown in FIG. 10, in the adjusting work of the alignment by the alignment adjusting device 20, firstly, an operator operates the vehicle 100 so as to send the vehicle into the alignment adjusting device 20 (STEP-1).

Next, the operator stops the vehicle 100 at a predetermined stop position while performing rough positioning (STEP-2).

Next, when the vehicle 100 is stopped at the predetermined stop position, the vehicle stopped state detection device 1 detects the stopped state of the vehicle 100 (STEP-3).

Then, the judgment is performed based on the stopped state of the vehicle 100 detected by the vehicle stopped state detection device 1 (STEP-4).

At the (STEP-4), the arithmetic unit 8 compares the stopped state of the vehicle 100 detected by the vehicle stopped state detection device 1 with predetermined (desirable) stopped state set at the design, calculates shear amounts along each axis and around each axis, and confirms whether each shear amount is less than a threshold prescribed previously or not so as to perform the judgment. The judgment is performed with a formula 1 shown below.

A judgment formula about the X-axis is illustrated.

The shear amount in the X-axis direction of the front wheels (in more detail, the mean value of the shear amounts in the X-axis direction of the left-front tire 11 and the right-front tire 12) is defined as $\Delta X_F$, the shear amount of the rear wheels (in more detail, the mean value of the shear amounts in the X-axis direction of the left-rear tire 13 and the right-rear tire 14) is defined as $\Delta X_R$, the shear amount in the X-axis direction of the body is defined as $\Delta X_V$, the shear angle around the X-axis of the front wheels (in more detail, the mean value of the shear angles around the X-axis of the left-front tire 11 and the right-front tire 12) is defined as $\Delta\theta_{XF}$, the shear angle of the rear wheels (in more detail, the mean value of the shear angles around the X-axis of the left-rear tire 13 and the right-rear tire 14) is defined as $\Delta\theta_{XR}$, the shear angle around the X-axis of the body is defined as $\Delta\theta_{XV}$, and the threshold is defined as x.

$$\left\{ \frac{(\Delta\theta_{XF} - \Delta\theta_{XR}) - \Delta\theta_{XV}}{(\Delta X_F - \Delta X_R) - \Delta X_V} \right\} < x \quad \text{[Formula 1]}$$

Then, similar judgment is also performed about the other axes (the Y-axis and the Z-axis). When at least one of the judgments about the axes does not satisfy the judgment formula, the operation of the operation switch 24 is annulled (STEP-5), and then the shear amount is displayed by the monitor 23 (STEP-6) so as to represent information for an operator to judge what direction and what distance the stopped state of the vehicle 100 is revised.

Then, based on the standard displayed by the monitor 23, the operator revises the stopped state of the vehicle 100 (STEP-7) and the vehicle stopped state detection device 1 detects the stopped state of the vehicle 100 again (STEP-3), and (STEP-3) to (STEP-7) are repeated until the shear amount of each of the axis directions and the shear amount around each of the axes become less than the prescribed threshold.

When all the judgment about each axis is satisfied, the purport thereof is displayed by the monitor 23 (STEP-8) so as to demand the operator to operate the operation switch 24. Then, when the operator operates the operation switch 24 (for example, pulls the operation part 24a) (STEP-9), the automatic control cycle of the adjuster 22 by the controller 21 is started (STEP-10).

As shown in FIG. 11, at the adjustment work of the alignment, a tie rod 26 which is the adjustment part for the toe angle may be arranged deeply inside a recess 25 formed in the body 10. Conventionally, when a tool is held to the tie rod 26 automatically by a robot or the like, the tool may touch the body 10 or the like because the stopped state of the vehicle 100 is not grasped correctly. Then, the adjustment work of the toe angle is performed by an operator each time. That obstructs the automating of the adjustment work of the alignment.

In the alignment adjusting device 20, the stopped state of the vehicle 100 can be grasped accurately by the vehicle stopped state detection device 1. Then, based on the information from the arithmetic unit 8, the position and angle of insertion of the adjuster 22 can be adjusted accurately by the controller 21.

Figure 12:
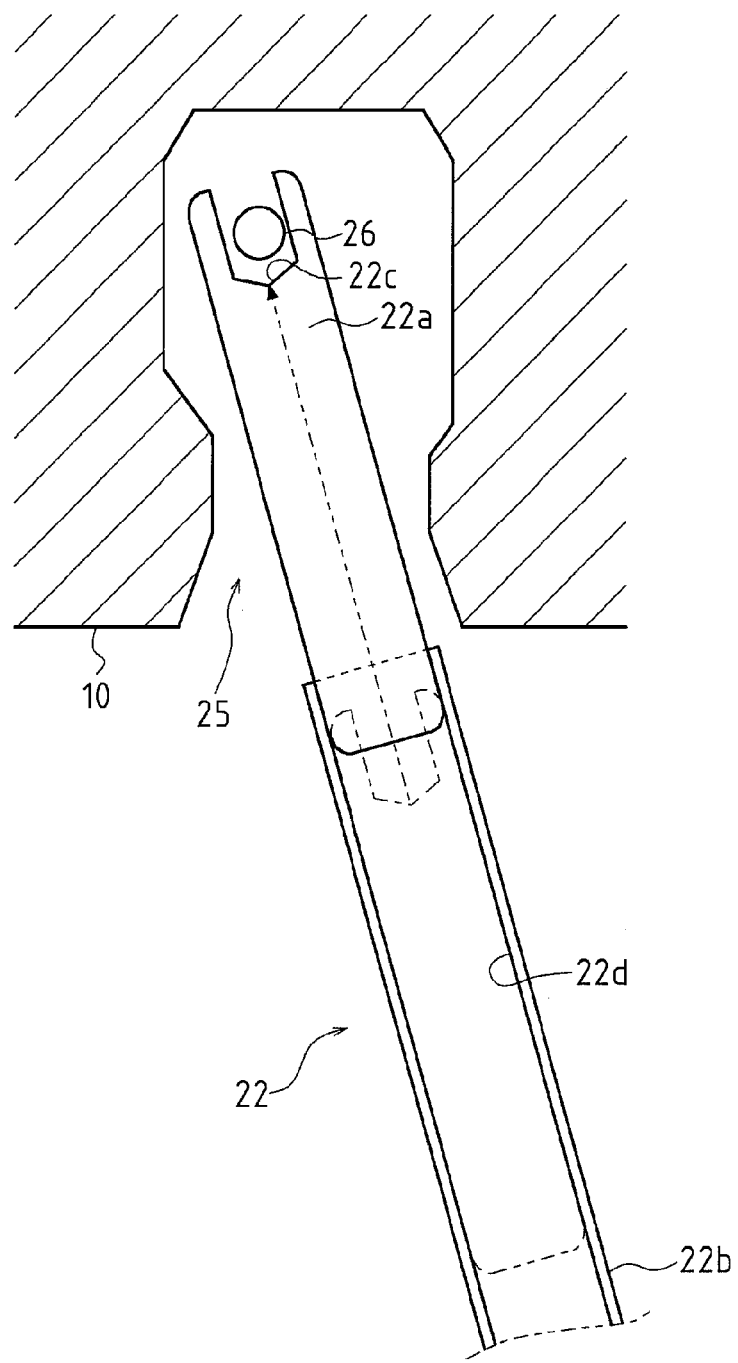
FIG. 12 is a schematic side view of automatic adjustment condition of a toe angle with the alignment adjusting device (under adjustment).

Then, as shown in FIG. 12, the slide part 22a of the adjuster 22 can be inserted into the recess 25 without touching the body 10 or the like, and the tool part 22c formed at the tip of the slide part 22a can be held accurately to the tie rod 26 arranged deeply inside the recess 25. Accordingly, the adjuster 22 can fasten and loosen the tie rod 26 without an operator. The controller 21 can controls the actuation of the adjuster 22 while detecting the toe angle of the vehicle 100 by the detection part 2 so as to adjust the fastening condition of the tie rod 26. Namely, by the alignment adjusting device 20, the adjustment work of the toe angle about the vehicle 100 can be automated.

As mentioned above, in the alignment adjusting device 20 according to the embodiment of the present invention, the arithmetic unit 8 detects the gap between the detection result of the stopped state of the vehicle 100 by the vehicle stopped state detection device 1 and the ideal stopped state of the vehicle 100. When the gap is less than a predetermined threshold x, the alignment of the vehicle 100 is adjusted automatically, and when the gap is more than the threshold x, the stopped state of the vehicle 100 is adjusted.

According to the construction, the adjuster 22 is prevented from touching the body 10 at the time of the alignment adjustment work.

When the work of adjustment of toe angle of the vehicle 100 and the like is finished and the automatic control cycle of the adjuster 22 by the controller 21 is finished completely (STEP-11), the series of automatic alignment adjustment work by the alignment adjusting device 20 is finished.

Namely, the alignment adjusting device 20 according to the embodiment of the present invention has the vehicle stopped state detection device 1 and adjusts the stopped state of the vehicle 100 based on the detection result of the stopped state of the vehicle 100 by the vehicle stopped state detection device 1.

According to the construction, the stopped state of the vehicle 100 can be detected regardless of the size and shape of the vehicle 100 accurately, whereby the alignment adjustment work can be automated.

Industrial Applicability

The present invention is adoptable suitably to an art for detecting a stopped state of a vehicle and can be used for work such as alignment adjustment work of the vehicle after detecting the stopped state of the vehicle.

The invention claimed is:

1. A device for detecting a stopped state of a vehicle having a plurality of tires and a body in which a plurality of fenders respectively corresponding to the tires are formed, comprising:
 a plurality of groups of distance sensors respectively corresponding to the tires and the fenders; and
 an arithmetic unit connected to the groups of the distance sensors,
 wherein
 each of the groups of the distance sensors comprises:
 a front distance sensor scanning the front portion of the outer side surface of the tire corresponding to the group of the distance sensors and detecting a coordinate of a portion of the front portion of the tire at which the tire expands the most outward along the direction of the side surface of the tire as a first point;
 a rear distance sensor scanning the rear portion of the outer side surface of the tire corresponding to the group of the distance sensors and detecting a coordinate of a portion of the rear portion of the tire at which the tire expands the most outward along the direction of the side surface of the tire as a second point;
 an upper distance sensor scanning the upper portion of the outer side surface of the tire corresponding to the group of the distance sensors and detecting a coordinate of a portion of the upper portion of the tire at which the tire expands the most outward along the direction of the side surface of the tire as a third point; and
 a fender part distance sensor scanning the fender corresponding to the group of the distance sensors and detecting a coordinate of a portion of the fender at which the fender expands the most outward along the direction of the side surface of the body as a fourth point, and
 the arithmetic unit detects an evaluation point of the tire based on a coordinate of a centroid point of a triangle formed with the first, second and third points detected by the group of the distance sensors, and detects an evaluation point of the fender based on the coordinate of the fourth point detected by the group of the distance sensors so as to detect the stopped state of the vehicle based on the coordinate of the evaluation point detected about each of the tires and the coordinate of the evaluation point detected about each of the fenders.

2. The device for detecting the stopped state of the vehicle according to claim 1, wherein the upper distance sensor also serves as the fender part distance sensor.

3. The device for detecting the stopped state of the vehicle according to claim 1,
 wherein each of the groups of the distance sensors comprises noncontact distance sensors, and
 wherein each of the distance sensors is arranged at a position separated by a predetermined distance from the corresponding tire.

4. The device for detecting the stopped state of the vehicle according to claim 3, wherein each of the groups of the distance sensors comprises laser sensors.

5. An alignment adjusting device comprising:
 the device for detecting the stopped state of the vehicle according to
 claim 1, wherein:
 the stopped state of the vehicle is adjusted based on the detection result of the stopped state of the vehicle by the device for detecting the stopped state of the vehicle.

6. The alignment adjusting device according to claim 5,
 wherein the arithmetic unit detects the gap between the detection result of the stopped state of the vehicle by the detection device and the ideal stopped state of the vehicle,
 wherein the arithmetic unit adjusts automatically the alignment of the vehicle when the gap is less than a predetermined threshold, and
 wherein the arithmetic unit adjusts the stopped state of the vehicle when the gap is more than the threshold.

7. A method for detecting a stopped state of a vehicle having a plurality of tires and a body in which a plurality of fenders respectively corresponding to the tires are formed, comprising:
 a plurality of groups of distance sensors respectively corresponding to the tires and the fenders and an arithmetic unit connected to the groups of the distance sensors,
 wherein:
 a coordinate of a portion of the front portion of the tire at which the tire expands the most outward along the direction of the side surface of the tire is detected as a first point;
 a coordinate of a portion of the rear portion of the tire at which the tire expands the most outward along the direction of the side surface of the tire is detected as a second point;
 a coordinate of a portion of the upper portion of the tire at which the tire expands the most outward along the direction of the side surface of the tire is detected as a third point;
 a centroid point of a triangle formed with the detected first, second and third points is employed as an evaluation point of the tire;
 a coordinate of a portion of the fender at which the fender expands the most outward along the direction of the side surface of the body is detected as a fourth point;
 the detected fourth point is employed as an evaluation point of the fender; and
 the arithmetic unit detects the stopped state of the vehicle based on the coordinate of the evaluation point detected about each of the tires and the coordinate of the evaluation point detected about each of the fenders.

8. The method for detecting the stopped state of the vehicle according to claim 7,
 wherein the first point is detected by a front distance sensor scanning the front portion of the outer side surface of the corresponding tire,
 wherein the second point is detected by a rear distance sensor scanning the rear portion of the outer side surface of the corresponding tire,
 wherein the third point is detected by an upper distance sensor scanning the upper portion of the outer side surface of the corresponding tire, and
 wherein the fourth point is detected by a fender part distance sensor scanning the corresponding fender.

9. The method for detecting the stopped state of the vehicle according to claim 8, wherein the fourth point is detected by the upper distance sensor also serving as the fender part distance sensor.

10. The method for detecting the stopped state of the vehicle according to claim 8, wherein each of the distance sensors is arranged at a position separated by a predetermined distance from the corresponding tire and detecting a corresponding one of the first, second, third and fourth points without making contact.

11. The method for detecting the stopped state of the vehicle according to claim 10, wherein each of the distance sensors comprises laser sensors.

* * * * *